Aug. 17, 1954  C. L. McCUEN  2,686,505
VARIABLE COMPRESSION RATIO ENGINE
Filed July 19, 1949  3 Sheets-Sheet 1

Inventor
Charles L. McCuen
By
Spencer, Willits, Helmig & Baillio
Attorneys

Aug. 17, 1954 C. L. McCUEN 2,686,505
VARIABLE COMPRESSION RATIO ENGINE
Filed July 19, 1949 3 Sheets-Sheet 2
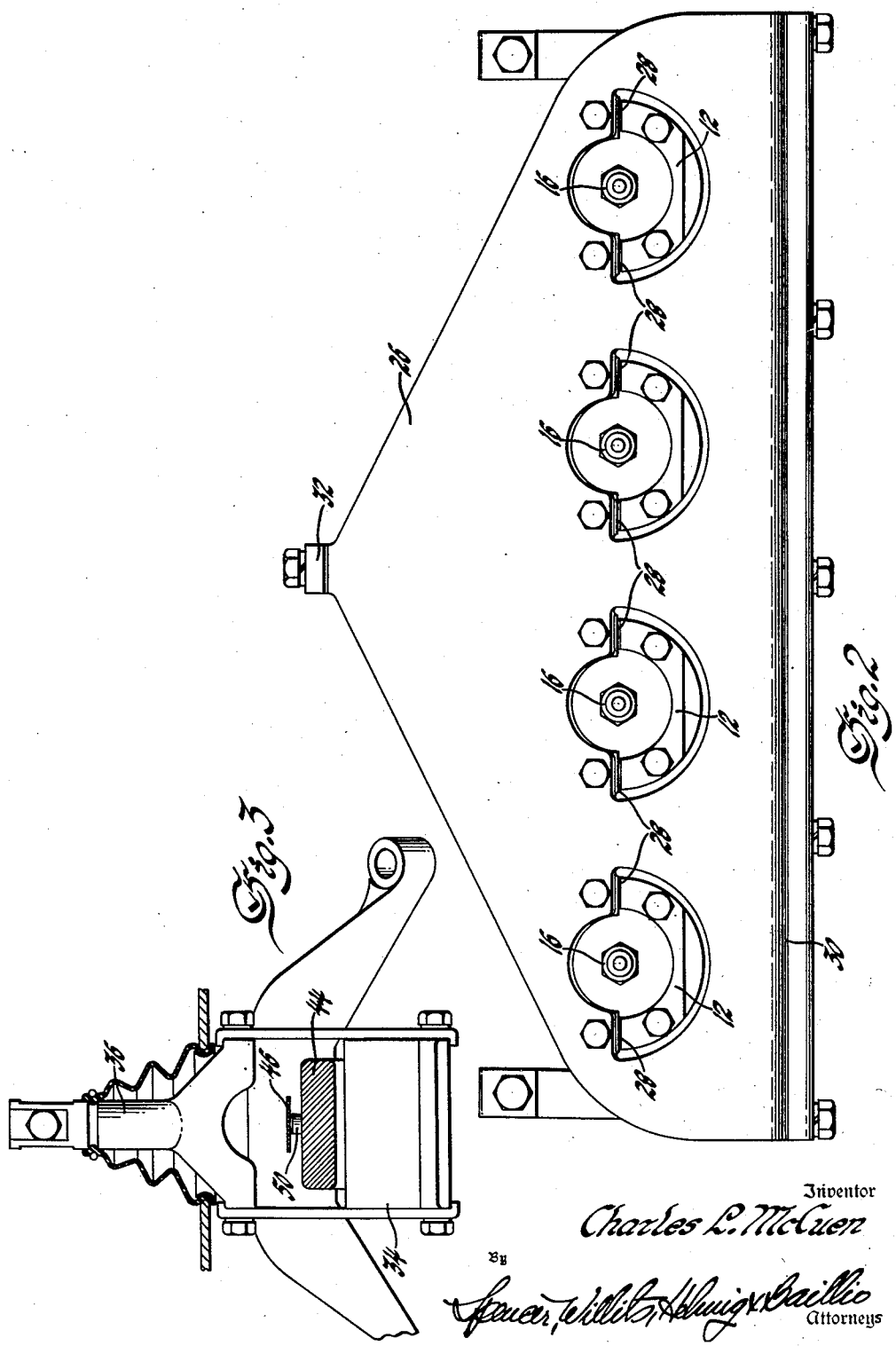
Inventor
Charles L. McCuen
By
Spencer, Willis, Helmig & Gaillio
Attorneys

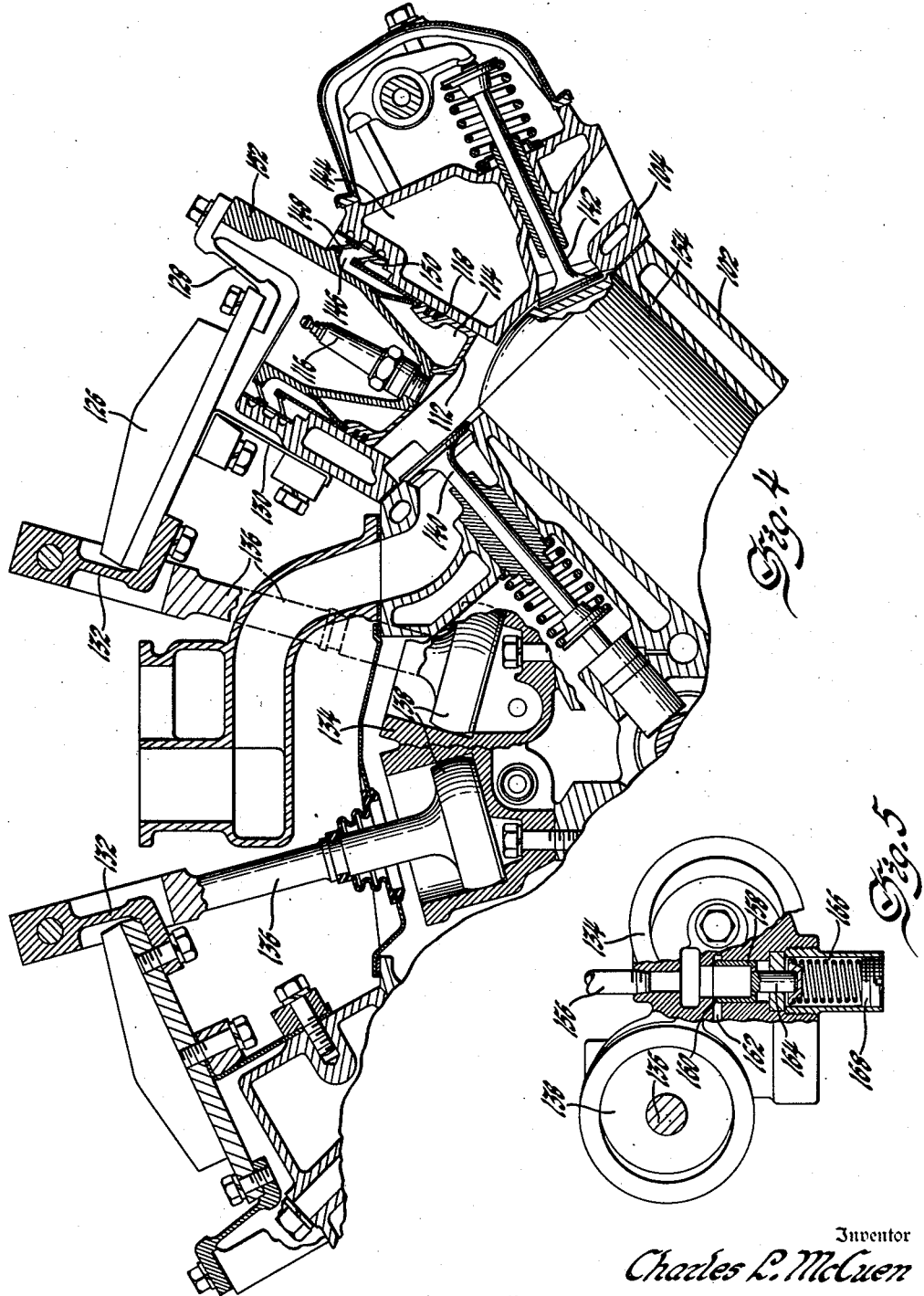

Patented Aug. 17, 1954

2,686,505

UNITED STATES PATENT OFFICE 2,686,505

VARIABLE COMPRESSION RATIO ENGINE

Charles L. McCuen, Birmingham, Mich., assignor to General Motors Corporation, Detroit, Mich., a corporation of Delaware Application July 19, 1949, Serial No. 105,508

5 Claims. (Cl. 123—48)

The present invention relates to internal combustion engines and more particularly to a means for automatically varying the combustion chamber volume of an internal combustion engine to get at all times the maximum compression ratio possible without detonation.

The thermal efficiency of an internal combustion engine increases as a function of compression ratio, other factors remaining constant. It is well known that the maximum compression ratio of a spark ignition internal combustion engine is limited by the maximum combustion chamber pressures and pressure rates permissible without detonation. The combustion chamber pressures, which will produce detonation, vary with combustion chamber design and with the octane rating of the fuel being utilized. These two factors influence the maximum pressures permissible and therefore permit increasing the compression ratio proportionately throughout the range of engine operation.

The maximum combustion chamber pressure and pressure rates occur at full load conditions. Therefore the compression ratio of a fixed volume combustion chamber engine is limited by full load operating conditions. With such a design the engine has a much lower compression ratio than would be otherwise permissible for operation under low and normal engine load conditions. It is therefore desirable to provide a means for varying the compression ratio of an internal combustion engine so as to maintain the mean effective pressure within the combustion chamber just below the detonation range under all conditions of operation and thereby realize the highest thermal efficiency possible with a given engine and fuel. It is also desirable to provide a means for rapidly decreasing the compression ratio as the engine load is rapidly increased from low or normal operating conditions to full load conditions to prevent harmful detonation during the transition period.

A very large number of prior attempts have been made to vary the compression ratio of an engine responsive to operating conditions. These prior workers in the field have utilized engine torque, intake manifold pressure, throttle position, and various other parameters of load for controlling the engine compression ratio. These prior devices, however, do not provide a sufficiently wide range of compression ratios, correctly controlled, to realize the greatest increase in thermal efficiency possible under varying conditions of operation. These prior devices also do not provide means for reducing the compression ratio at a sufficiently high rate to avoid detonation when a load is rapidly applied to the engine. Most of these devices have linkages with bearings requiring lubrication and subject to backlash.

It is therefore an object of the present invention to provide a means for automatically varying the compression ratio of an internal combustion engine responsive to its combustion chamber mean effective pressure.

It is another object of the present invention to provide a means responsive to the combined mean effective pressure in a plurality of cylinders for controlling the compression ratio of the cylinders simultaneously.

It is another object of the present invention to provide a means for rapidly decreasing the compression ratio of an internal combustion engine when a load is suddenly applied.

It is another object of the present invention to provide a linkage between a movable wall in a combustion chamber and a servo mechanism having zero backlash and no bearings requiring lubrication.

It is a further object of the present invention to provide a liquid servo mechanism, for varying the engine compression ratio, controlled by a constant pressure fluid source under normal operating conditions, and having an auxiliary valve therein for releasing the fluid pressure from the servo mechanism when this pressure exceeds a predetermined amount, and thus rapidly decreasing the compression ratio when a load is suddenly applied to the engine.

Other objects of the present invention will become apparent upon reading the specification and inspection of the drawings and will be specifically pointed out in the claims.

Referring to the figures in the drawings, Figure 1 is a transverse partial sectional view of a sleeve valve engine utilizing the present invention.

Figure 2 is a plane view showing a rocker plate for simultaneously controlling the compression ratio of a plurality of cylinders from a single servo mechanism.

Figure 3 is a partial sectional view showing a means for mounting the servo motor.

Figure 4 is a transverse partial sectional view of an F-head engine utilizing a second modification of the present invention.

Figure 5 is a partial sectional view of the control valve used in the modification of the invention shown in Figure 4.

Figure 1:
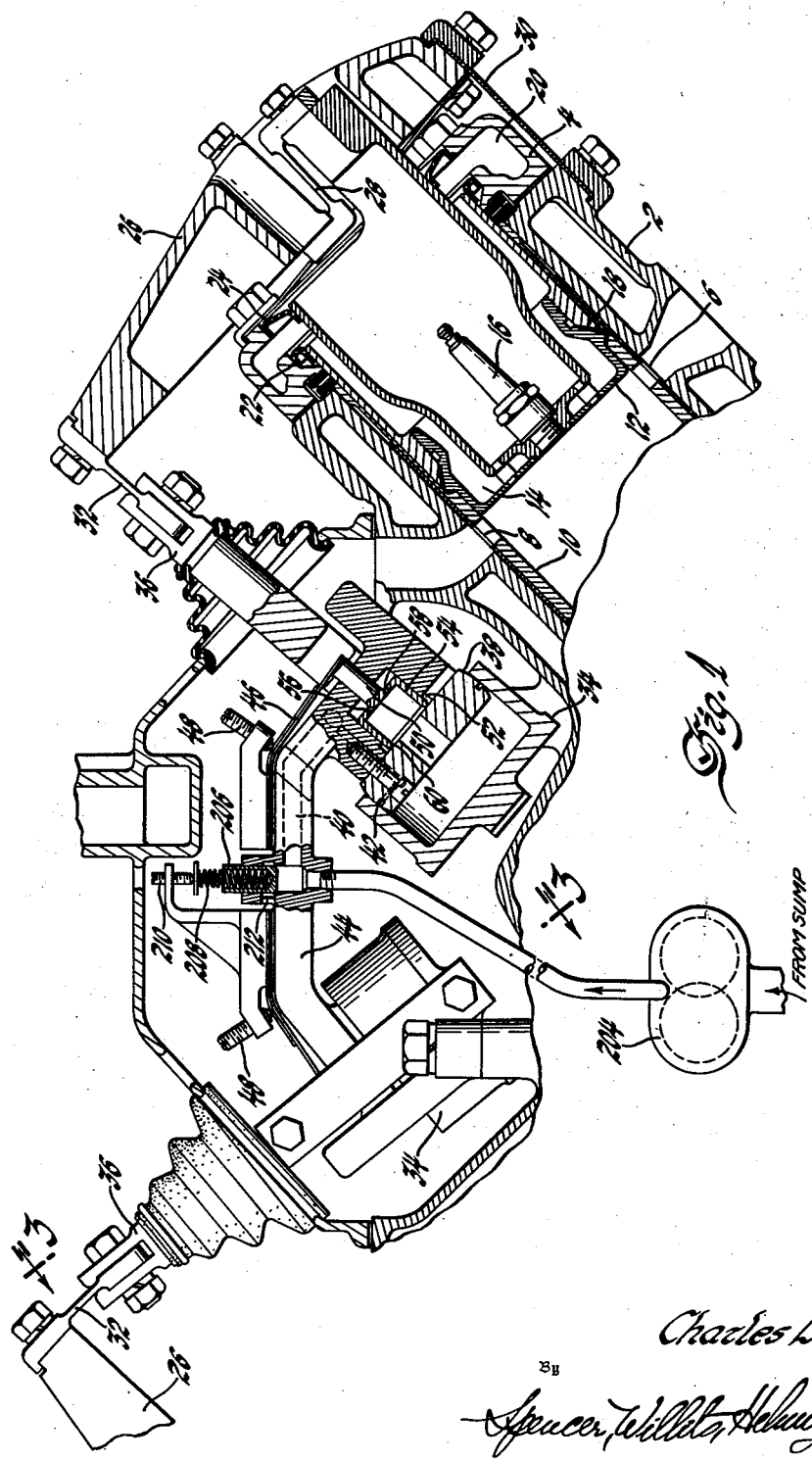

Referring more particularly to Figures 1, 2 and 3, 2 is the engine block of a V-type double sleeve valve engine. 4 is a detachable head rigidly bolted to the engine block 2. The block has a series of cylinders therein with reciprocating sleeves to control the burned gas exhaust and fuel-air intake valve openings 6 and 8 respectively. Located inside said sleeves are fixed liners 10 in which the pistons reciprocate during engine operation. A movable cylinder head or control piston 12 is adjustably mounted within the upper end of the liner 10 in each cylinder to vary the volume of the combustion chamber therein and thus to vary the compression ratio of the engine. This adjustable control piston 12 has a water jacket 14 therein, carries a spark plug 16 and has sealing rings 18 by which the threaded parts thereof are connected together. The water jacket 14 is connected to the water jacket 20 of the stationary head 4 by means of flexible seals 22 and 24. The control piston 12 is operatively secured to the rocker plate 26 by means of a control piston hinge 28. The hinge 28 is rigidly attached to both the control piston 12 and the rocker plate 26 but has sufficient flexibility to allow movement of the control piston and rocker plate. The rocker plate 26 is hinged to the block 2 by means of a rocker plate hinge 30 made of sheet metal or other suitable material. It may thus be seen that as the rocker plate 26 is moved about the hinge 30 as a pivot, the control piston 12 is caused to reciprocate within the cylinder beyond the end of the liner 10. Mounted at the extremity of the rocker plate 26 opposite that of the hinge 30 is a reactor hinge 32. This reactor hinge 32 is rigidly attached to a reactor cylinder 34 by a yoke 36. The cylinder 34 is subjected to a liquid pressure so as to cause it to move in an axial direction relative to its mating stationary piston 38. The piston 38 has a liquid passage 40 therein for introducing liquid under pressure to the cylinder 34 through the annular port 42 in the piston 38. This piston 38 is rigidly attached to the engine block by means of a bracket 44. The source of constant oil pressure for the servo system includes a reservoir, an engine driven gear pump 204 and an adjustable constant pressure relief valve 206. The spring 208 biasing the valve 206 is adjusted by screw 210 so that the desired constant fluid pressure times the area of the valve 206 is equal to the force exerted by the spring 208. When the fluid pressure resulting from the operation of the pump exceeds this force, the valve 206 will be moved to open the port 212. The bracket 44 also has attached thereto a leaf spring 46 the tension on which may be adjusted by the adjusting screw 48. The piston 38 has located concentric therewith a differential valve member having a stem 50 with an annular exhaust port 52. This valve has a cup-shaped lower end 54 communicating with the cylinder 34 and ports 56 and 58 leading to the space at the stem end of the member and an annular sealing surface 60 surrounding an opening leading to the cylinder 34. It may thus be seen that the force exerted by the valve member against the spring 46 is equal to the unit pressure of the liquid within the piston 34 times the cross sectional area of the stem 50 of this valve. The force exerted by the spring 46 on the valve is so adjusted by use of the adjusting screw 48 that the valve will not open until the mean effective pressure is very near the detonation point for that engine.

Referring now to Figure 4, a modification of the present invention is shown incorporated in a 90° V-8 F-head engine. This modification is in general similar to that shown in Figures 1 and 2 but varies therefrom in certain important details. In this figure 102 is an engine block having a fixed head 104 rigidly attached thereto. This fixed head has a control piston 112 therein which may be reciprocated to vary the volume of the combustion chamber. This figure shows, as is common in F-head engines, an intake valve 140 located in the engine block and an exhaust valve 142 located in the head 104. The spark plug 116 for igniting the fuel mixture is located in the control piston 112 and reciprocates therewith. The control piston 112 has a water jacket 114 therein in communication with the water jacket 144 in the head 104 through conduit 146 between flexible seals 148 and 150. The combustion chamber gas pressure is prevented from flowing by the movable piston 112 by means of rings 118 of conventional design. The control piston 112 has a projecting portion 152 thereon attached to one end of the rocker plate 126 by means of a solid hinge 128. The other end of this rocker plate 126 is attached to a reactor piston rod 136 by means of a solid hinge 132. This rocker plate is attached to the engine head 104 as a pivot by means of a solid hinge 130. The rod 136 is attached to a reactor piston 138 located in a reactor cylinder 134 which is rigidly secured to the block of the engine. It may thus be seen that as the piston 138 is caused to reciprocate in the cylinder 134, the control piston 112 is caused to reciprocate in the head 104 to vary the combustion chamber volume. The gas pressure within the cylinder 154 is applied to the underface of the control piston 112 exerting a force thereon equal to the average unit or mean effective pressure times the cross sectional area of the control piston. This force is transmitted through the rocker plate 126 to the piston 138. In order to place this system in equilibrium conditions, the average or mean effective force exerted on the underface of the reactor piston 138 by the oil in cylinder 134 must be such as to just balance the force exerted on the underface of the control piston 112. The cylinder 134 is supplied with oil through a conduit leading from a regulated pressure engine driven pump similar to that employed in the structure shown by Figure 1.

Referring more particularly to Figure 5, the construction of the means of controlling oil pressure to the cylinder 134 is shown in greater detail. The hydraulic fluid used to operate the servo system, including the cylinder 134 and piston 138, is introduced under a substantially constant pressure at 156. Under normal operating conditions the oil leak past the piston 138 and the outward movement of the piston is compensated for by the oil supplied to the inlet to the cylinder 136 by conduit 156 and is sufficient to maintain the pressure required to balance the force exerted against the control piston 112 and thus to maintain the mean effective pressures within the engine cylinder 154 at the highest practical value without detonation, thereby to realize the greatest engine thermal efficiency. Under conditions of rapid increase in mean effective pressure in the cylinder 154, such as occurs when a sudden load is applied by the engine and the throttle is opened to take care of this load, the leakby between the piston 138 and the cylinder 134 does not allow sufficiently rapid movement of the control piston 112 to avoid detonation. The present invention therefore provides a dump valve 158 having a valve surface 160 between the cylinder 134 and an annular exhaust port 162. The valve 158 is of the differential pressure type the force exerted by the liquid on the valve being equal to the unit pressure of the liquid times the cross sectional area of the stem 164. The force applied to the stem 164 by means of spring 166 adjustable by screw 168 is sufficient to balance the fluid force on the stem. This allows opening of the valve only when this fluid is under a predetermined pressure exceeding the unit pressure so balanced by the spring 166. This predetermined pressure is selected so as to be a fixed amount greater than that of the constant pressure source. It may therefore be seen that as the pressure in the cylinder 154 increases rapidly, a reaction force on the piston 138 is produced to thereby increase the fluid pressure in the cylinder 134 sufficient to cause the dump valve 158 to open thus rapidly decreasing the compression ratio.

It may thus be seen that in either of the modifications of the present invention a means is provided for maintaining the mean effective pressure in the engine combustion chamber substantially constant under normal operating conditions with a means for rapidly decreasing this compression ratio under rapidly increasing load conditions.

*Operation*

When the engine is stopped, the pressure exerted against the reactor piston is zero and the compression ratio of the engine is minimum. When the operator starts the engine, the hydraulic pump introduces oil under the reactor piston tending to increase the compression ratio. Within a few seconds the system reaches equilibrium under idling condition of operation, that is, the compression ratio is increased to its maximum and the control piston is fully depressed. As the engine is placed under load, the volume of the fuel-air mixture introduced into the combustion chamber is increased. This increases the mean effective pressure in the combustion chamber thereby increasing the force exerted on the reactor piston. This causes the reactor piston to tend to move inwardly with respect to the cylinder of the servomotor, thereby increasing the fluid pressure in the latter to overcome the force exerted by the spring controlling the discharge of fluid in the servo mechanism thereby permitting the reactor piston to raise the control piston to decrease the compression ratio. As the engine is operated in the normal operating condition, the control piston "floats" maintaining a mean effective pressure within the combustion chamber constant at just that necessary to balance that constant force exerted on the reactor piston by the pressure control fluid thereby maintaining the compression ratio and hence the thermal efficiency of the engine at the highest compatible with non-detonating conditions. It is undesirable to have a control pressure fluid source of sufficient size to permit the use of a high leakage past the reactor piston. Therefore under rapidly increasing load conditions, a dump valve is provided to take care of the demand for a rapid decrease of the compression ratio. Therefore if the load on the engine is increased at a rate so great that the leakby past the reactor piston cannot move the control piston rapidly enough to maintain the mean effective pressure below detonating conditions, the dump valve operates to rapidly exhaust the servo cylinder and reduce the compression ratio rapidly.

It is to be understood also that although the invention has been described with specific reference to a particular embodiment thereof, it is not to be so limited, since changes and alterations therein may be made which are within the full intended scope of this invention as defined by the appended claims.

I claim:

1. An internal combustion engine comprising a cylinder having a movable wall forming a part of the combustion chamber thereof and being adapted to increase and decrease the volume of said combustion chamber as the mean effective pressure in said cylinder increases and decreases, a servo-motor having a movable wall, means for applying fluid under pressure to said servo-motor to determine the position of said movable wall, a rocker plate, a continuous flexible hinge member rigidly secured to said rocker plate and to a stationary part of said engine, a continuous flexible hinge member rigidly secured to said rocker plate and to said combustion chamber wall, and a continuous flexible hinge member rigidly secured to said rocker plate and to said movable wall of said servo-motor.

2. An internal combustion engine comprising a cylinder having a movalbe wall forming a part of the combustion chamber thereof and being adapted to increase and decrease the volume of said combustion chamber as the mean effective pressure in said cylinder increases and decreases, a servo-motor having a movable wall, means for applying fluid under pressure to said servo-motor to determine the position of said movable wall, a rocker plate, a continuous flexible hinge member rigidly secured to said rocker plate and to a stationary part of said engine, a continuous flexible hinge member rigidly secured to said rocker plate and to said combustion chamber wall, a continuous flexible hinge member rigidly secured to said rocker plate and to said movable wall of said servo-motor, and pressure regulating means associated with said servo-motor and maintaining a substantially constant fluid pressure in said servo-motor and regardless of the position of said movable wall of said servo-motor as determined by the position of said movable wall of said cylinder acting through said rocker plate and said hinges.

3. An internal combustion engine comprising an engine block having a plurality of aligned cylinders formed therein, a plurality of movable walls forming parts of the combustion chambers of said cylinders, a rocker plate extending throughout the length of said block, a flexible tension member secured rigidly to said rocker plate and to said block and in parallel relation to the alignment of said cylinders, a plurality of flexible tension members secured rigidly to said rocker plate and to said movable walls for determining the position of said walls relative to said block, a servomotor for operating said rocker plate, and a flexible tension member secured rigidly to said rocker plate and to a movable wall of said servo-motor.

4. An internal combustion engine comprising an engine block having rows of aligned cylinders formed therein with the planes through the axes of said cylinders intersecting at the crankshaft ends of said cylinders, said cylinders each having movable walls forming parts of the combustion chambers of said cylinders, fluid pressure actuated means having movable wall means and being located in the angular space between said cylinder rows, a rocker plate for each of said rows of cylinders and being pivotally connected to said block adjacent each of said rows of cylinders, said rocker plate for each of said rows of cylinders being also pivotally connected to said movable cylinder walls in one row of said cylinders, means pivotally connecting the adjacent ends of a pair of said rocker plates to said movable wall means of said fluid pressure actuated means, means for supplying fluid under pressure to said fluid pressure actuated means for supporting said movable wall means, means for exhausting fluid from said fluid pressure actuated means at a rate great enough to prevent a substantial increase in the fluid pressure in said fluid pressure actuated means, and means opposing the return of fluid to said fluid pressure supply means upon an increase in pressure in said fluid pressure actuated means.

5. An internal combustion engine comprising an engine block having a pair of rows of aligned cylinders formed therein with the crankshaft ends of said cylinders directed toward one another, a pair of rocker plates pivotally secured to the head ends of said cylinders and having movable ends projecting into the space between and at one side of said rows of cylinders in opposite relation, a wall forming a part of the combustion chamber in each cylinder of said rows and being movable with respect to the remaining walls of each cylinder, means pivotally securing said movable combustion chamber walls in each row of said cylinders to one of said rocker plates at equal distances from the fulcrum of said rocker plate with respect to said row of said cylinders, and means between said rows of cylinders for moving the adjacent ends of said rocker plates simultaneously in the same direction and to the same extent for simultaneously and equally varying the compression ratio in all of the cylinders in said rows.

References Cited in the file of this patent

UNITED STATES PATENTS

| Number | Name | Date |
|---|---|---|
| Re. 18,595 | Wilson | Sept. 13, 1932 |
| 512,142 | Wood | Jan. 2, 1894 |
| 1,437,929 | Brockway | Dec. 5, 1922 |
| 1,504,101 | Davidson | Aug. 5, 1924 |
| 1,757,907 | Jameson et al. | May 6, 1930 |
| 2,120,012 | Andreau | June 7, 1938 |
| 2,142,621 | Tsuneda et al. | Jan. 3, 1939 |
| 2,145,017 | Tsuneda | Jan. 24, 1939 |
| 2,163,015 | Wagner | June 20, 1939 |
| 2,399,276 | Kratzer | Apr. 30, 1946 |

FOREIGN PATENTS

| Number | Country | Date |
|---|---|---|
| 813,503 | France | Feb. 22, 1937 |